(12) United States Patent
Hirai et al.

(10) Patent No.: US 6,182,803 B1
(45) Date of Patent: Feb. 6, 2001

(54) SPRING-ACTUATED ELECTROMAGNETIC BRAKE WITH NOISE SUPPRESSING DEVICE

(75) Inventors: Tatsuya Hirai; Masayuki Fujii, both of Osaka (JP)

(73) Assignee: Tsubakimoto Chain Co., Osaka (JP)

(*) Notice: Under 35 U.S.C. 154(b), the term of this patent shall be extended for 0 days.

(21) Appl. No.: 09/474,157

(22) Filed: Dec. 29, 1999

(30) Foreign Application Priority Data

Feb. 1, 1999 (JP) .................................................. 11-024439

(51) Int. Cl.[7] ............................ H02K 7/106; H02K 5/24; F16D 59/02
(52) U.S. Cl. ............................................ 188/171; 188/161
(58) Field of Search .................................... 188/158–164, 188/171; 192/111 A, 84.5, 84.51, 90; 310/77, 93

(56) References Cited

U.S. PATENT DOCUMENTS

| | | | |
|---|---|---|---|
| 4,684,838 | * 8/1987 | Casanova | 310/93 |
| 4,982,825 | * 1/1991 | Sekella | 192/90 |
| 5,067,593 | * 11/1991 | Tanaka et al. | 188/171 |
| 5,154,261 | * 10/1992 | Tanaka et al. | 188/171 |
| 5,186,286 | * 2/1993 | Lindberg | 188/171 |
| 5,433,297 | * 7/1995 | Kuivamaki | 188/171 |

FOREIGN PATENT DOCUMENTS 7-16576 * 3/1995 (JP).

* cited by examiner

Primary Examiner—Chris Schwartz
(74) Attorney, Agent, or Firm—Dann, Dorfman, Herrell and Skillman, P.C.; Henry H. Skillman

(57) ABSTRACT

A spring-actuated electromagnetic brake includes a noise-suppressing device for suppressing a striking noise emitted when an armature is attracted onto a field to release the brake when an electromagnetic coil is excited to magnetize the field. The noise-suppressing device is comprised of a plurality of hemispherical elastic members each disposed in one of recesses formed in one of two opposed surfaces of the field and the armature. When the brake is in the engaged state, a hemispherical surface of each elastic member partially projects from the recess and is in contact with the other of the two opposed surface. When subjected to a compressive force or pressure applied from the armature, the hemispherical elastic member undergoes elastic deformation as a whole and does not produce any locally concentrated elastic deformation. The hemispherical elastic member is highly durable and is able to greatly suppress the striking noise generated when the brake is released.

2 Claims, 6 Drawing Sheets

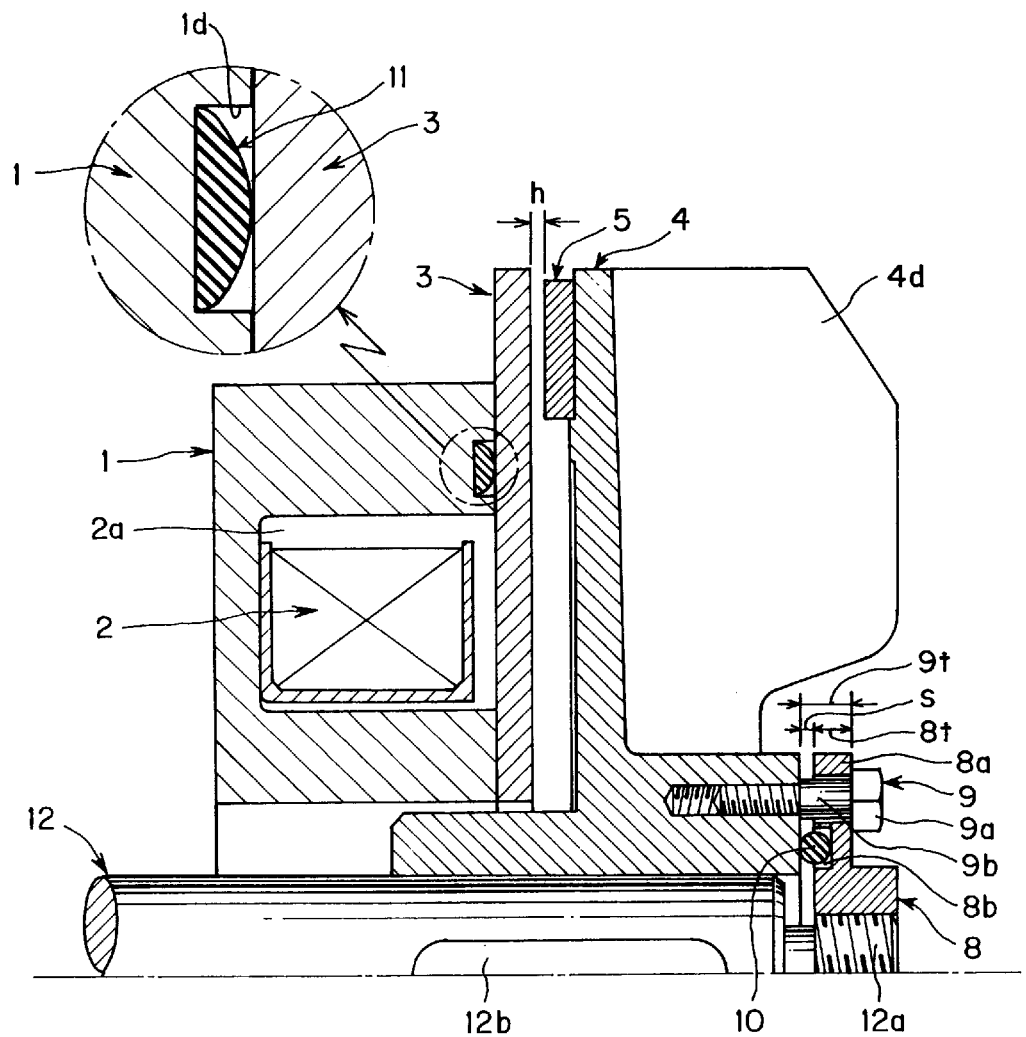

FIG. 6B
FIG. 6A (Prior Art)
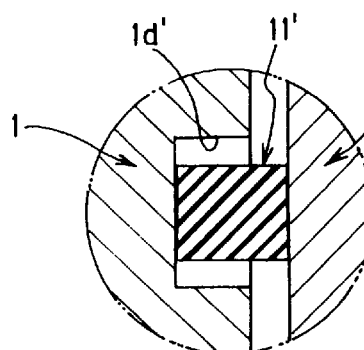
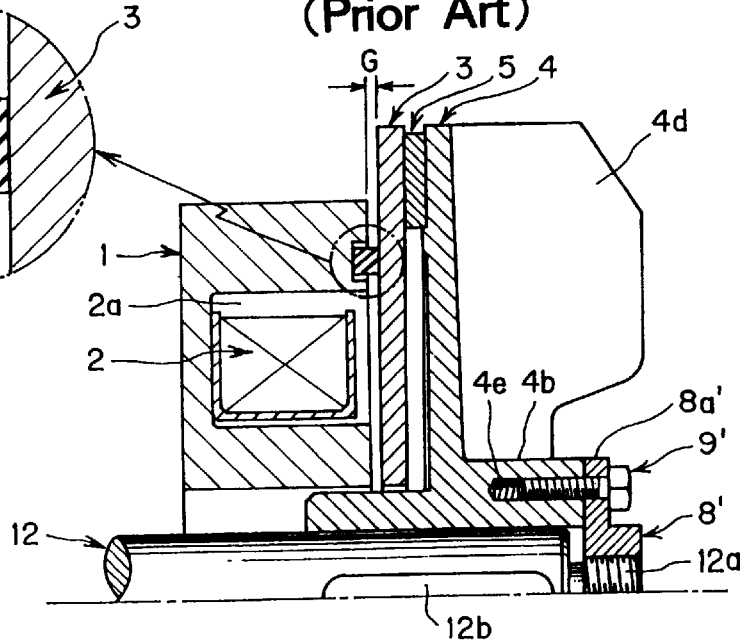
FIG. 7B
FIG. 7A (Prior Art)
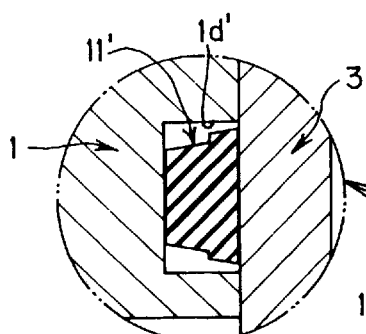
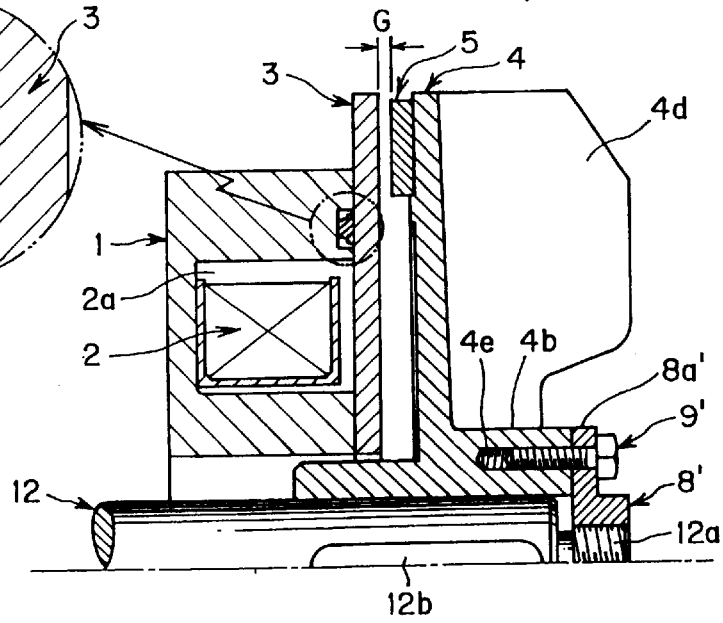

SPRING-ACTUATED ELECTROMAGNETIC BRAKE WITH NOISE SUPPRESSING DEVICE

BACKGROUND OF THE INVENTION

1. Field of the Invention

The present invention relates to a spring-actuated electromagnetic brake having a noise suppressing device for suppressing a striking noise generated when an armature is attracted onto a field upon magnetization of the field to release the brake.

2. Description of the Related Art

Noise suppressing devices incorporated in conventional spring-actuated electromagnetic brakes so as to reduce a striking noise emitted when an armature is attracted onto a magnetized field to release the brake are generally classified into five groups as enumerated below.

(1) An O-ring fitted in an annular groove or recess formed in one of two opposed surfaces of the field and armature in such a manner that the O-ring partially projects from the annular recess when the brake is in the engaged state (Japanese Patent No. 2669944).

(2) A cushioning sheet member disposed between the field and the armature (Japanese Utility Model Laid-open Publication No. HEI 5-25994).

(3) A plurality of tubular noise-suppressing rubber blocks each received in one of plural recesses formed in an attracting surface of the field in such a manner that when the brake in the engaged state, the tubular noise-suppressing rubber block partially projects from the attracting surface (Japanese Utility Model Laid-open Publication No. HEI 7-16576).

(4) A plurality of tubular noise-suppressing rubber blocks each received in one of plural recesses formed in an attracting surface of the field in such a manner that the tubular noise-suppressing rubber block partially projects from the attracting surface when the brake is in the engaged state. In combination with the tubular noise-suppressing rubber blocks, an armature formed from a vibration-damping steel sheet is used (Japanese Utility Model Laid-open Publication No. HEI 8-7808).

(5) A plurality of solid cylindrical noise-suppressing rubber blocks each received in one of plural recesses formed in an attracting surface of the field in such a manner that the solid cylindrical noise-suppressing rubber block partially projects from the attracting surface when the brake is in the engaged state.

The conventional noise-suppressing devices enumerated above still each have a problem, as discussed below.

(1) The O-ring, if the diameter of its circular cross section is small, can achieve only a limited elastic deformation, failing to perform the desired noise suppressing function. By contrast, if the diameter of the circular cross section of the O-ring becomes large, a correspondingly large cross-sectional area is required for the annular recess, which will deteriorate attracting power of the field.

(2) The cushioning sheet member disposed between the field and the armature exerts direct influence on the attracting power of the field. Namely, the larger the thickness of the cushioning sheet member, the lesser the attracting power of the field. By contrast, as the thickness of the cushioning sheet becomes small, the durability of the cushioning sheet member decreases.

(3, 4 and 5) The hollow or solid cylindrical noise-suppressing rubber blocks incorporated in the spring-actuated electromagnetic brake are shown in FIGS. 6A and 7A. The brake shown in FIG. 6A is in its engaged position, while the grake shown in FIG. 7A is in its released position. When the brake shown in FIG. 6A is to be released, an electromagnetic coil 2 embedded in a field 1 is excited to magnetize the field. Upon magnetization of the field, an armature 3 is attracted onto the field 1. As the armature 3 moves toward the field, the cylindrical noise suppressing blocks 11' (FIG. 7B) are axially compressed by the armature 3. In this instance, due to the cylindrical shape of the rubber blocks 11', it is likely that the cylindrical rubber blocks undergo local elastic deformation concentrated on respective tip end portions, as best shown in FIG. 7B. The locally concentrated elastic deformation will soon deteriorate the durability of the rubber blocks.

(4) The armature formed from a vibration-damping steel sheet required an increased number of parts used and hence is relatively expensive to manufacture. Additionally, in order to generate the necessary attraction, the armature has a relatively large thickness. This will add to the overall size of the brake.

SUMMARY OF THE INVENTION

It is accordingly an object of the present invention to provide a spring-actuated electromagnetic brake having a noise suppressing device which is free from local deformation when subjected to a compressive force, is highly durable, and is able to achieve a great suppression of striking noise when the brake is released.

To achieve the foregoing object, the present invention provides a spring-actuated electromagnetic brake which comprises: a stationary field having an electromagnetic coil embedded therein for magnetizing the field; a brake plate mounted on a rotating shaft for co-rotation with the rotating shaft; an armature disposed between the field and the brake plate and movable only in the axial direction of the rotating shaft; a brake spring urging the armature against the brake plate to normally hold the brake in the engaged state; and a noise-suppressing device for suppressing a striking noise emitted when the armature is attracted onto the field to release the brake when the electromagnetic coil is excited to magnetize the field. The the noise-suppressing device is a plurality of hemispherical elastic members disposed in a plurality of recesses formed in one of two opposed surfaces of the field and the armature. The hemispherical elastic members each have a hemispherical surface which, when the brake is in the engaged state, projects from a corresponding one of the recesses and is in contact with the other of the two opposed surfaces.

Preferably, the recesses are arranged concentrically with the axis of the rotating shaft and spaced in the circumferential direction at equal angular intervals.

With this arrangement, when the electromagnetic coil is excited to release the brake, the field is magnetized. Upon magnetization of the field, the armature is attracted onto the field. As the armature approaches the field, the hemispherical elastic members undergo elastic deformation to thereby suppress a striking noise generated when the armature strikes on the field. When compressed between the field and the armature, each hemispherical elastic member undergoes elastic deformation as a whole and does not produce any local deformation. Thus, the durability of the elastic body is extremely high.

When current to the electromagnetic coil is removed to engage the brake, the field is demagnetized and the armature is urged against the brake plate by the force of the brake spring. In this instance, since the hemispherical elastic members are allowed to spring back to its original shape, an elastic recovery force of the elastic members acts on the armature in the same direction as the biasing force of the brake spring. Thus a certain reduction in the braking time (response time) of the brake can be achieved.

The above and other objects, features and advantages of the present invention will become apparent to those versed in the art upon making reference to the following detailed description and the accompanying sheets of drawings in which a certain preferred embodiment incorporating the principle of the present invention is shown by way of illustrative example.

BRIEF DESCRIPTION OF THE DRAWINGS

FIG. 5A is a view similar to FIG. 4A, but showing the electromagnetic brake in the released state;

FIG. 5B is an enlarged view of a portion of FIG. 5A;

FIG. 6A is a fragmentary cross-sectional view showing conventional electromagnetic brake having a noise suppressing device as it is in the engaged state;

FIG. 6B is an enlarged view of a portion of FIG. 6A;

FIG. 7A is a view similar to FIG. 6A, but showing the conventional electromagnetic brake as it is in the released state; and FIG. 7B is an enlarged view of a portion of FIG. 7A.

DETAILED DESCRIPTION OF THE PREFERRED EMBODIMENT

Figure 1:
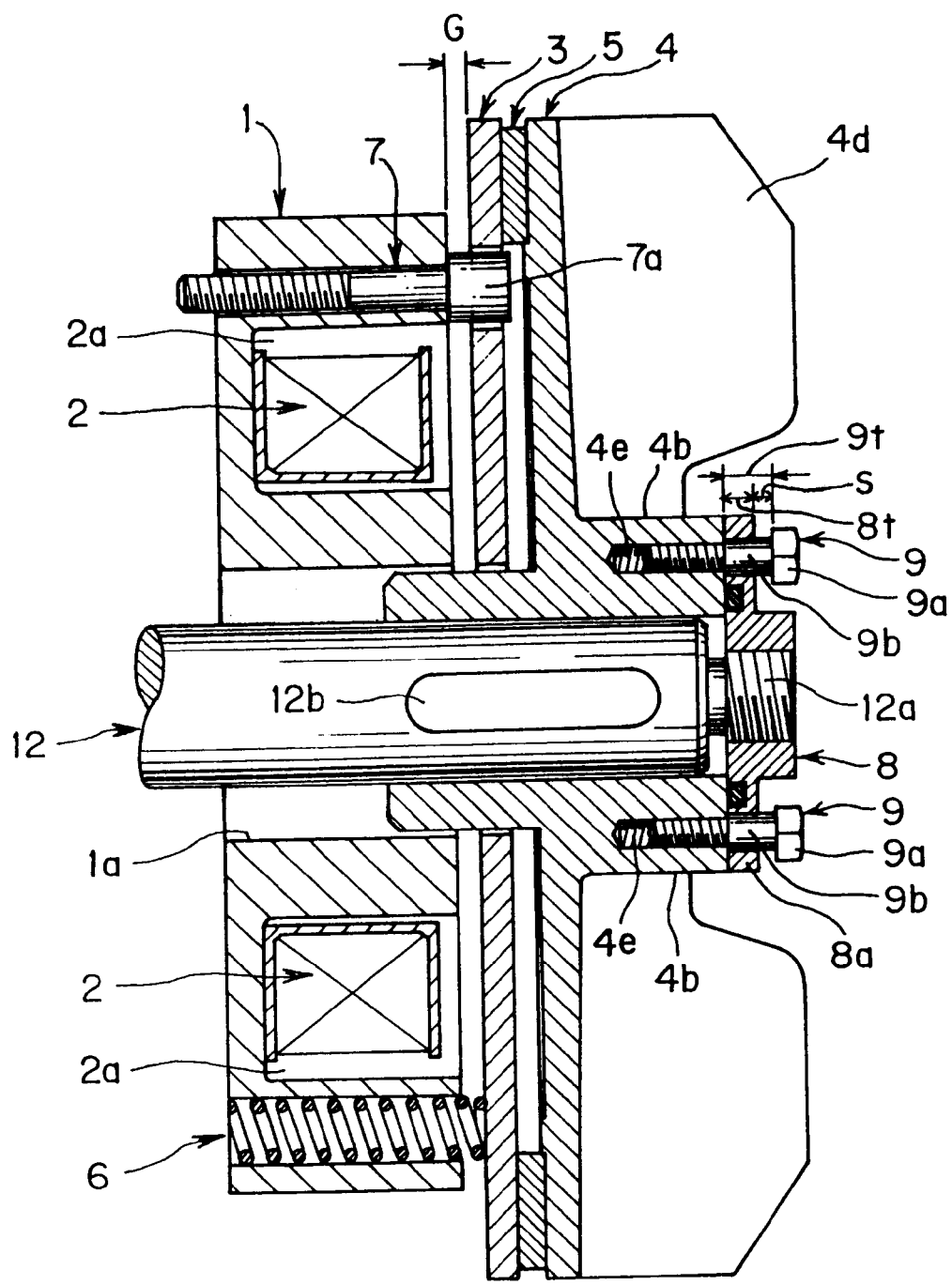
FIG. 1 is a cross-sectional view showing the general construction of a spring-actuated electromagnetic brake having a noise suppressing device according to an embodiment of the present invention.

A preferred structural embodiment of the present invention will be described in greater detail with reference to the accompanying drawings wherein like parts are designated by the same reference characters throughout the several views.

Figure 2:
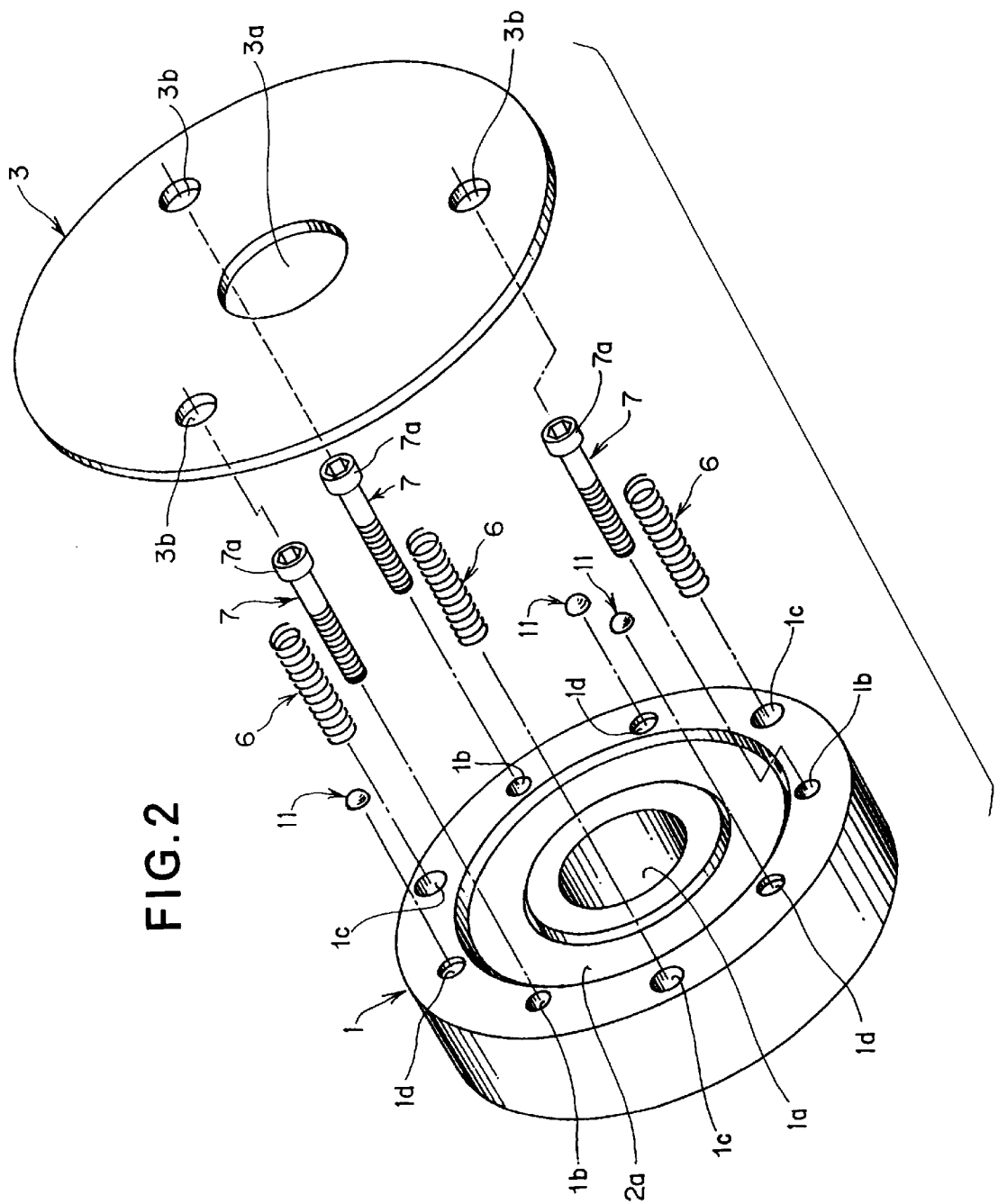
FIG. 2 is an exploded perspective view of a part of the electromagnetic brake including a field, an armature and related parts thereof.

As shown in FIGS. 1 and 2, a spring-actuated electromagnetic brake having a noise suppressing device according to one embodiment of the present invention includes a field 1 formed from a magnetic material and having an electromagnetic coil 2 (FIG. 1) embedded in the field 1 via an insulating member 2a. The field 1 has three bolt-insertion holes 1b (FIG. 2) formed therein at equal angular intervals about a central axis of the field 1. The field 1 is attached for example, to the rear end of a frame of a motor (neither shown) by three attaching bolts 7 extending through the bolt-insertion holes 1b. The field 1 further has three spring retaining holes 1c (FIG. 2) formed therein at equal angular intervals about the central axis of the field 1. Each of the spring retaining holes 1c receives therein one brake spring 6. One end of the brake spring 6 abuts on the rear end of the non-illustrated motor frame.

The electromagnetic brake 1 also includes an armature 3 disposed in confronting relation to the insulating member 2a of the electromagnetic coil 2. One end face of the armature 3 is in contact with the opposite end of the brake spring 6 so that by the force of the brake spring 6 the armature 3 is urged in a direction toward a brake plate 4 (FIG. 1) described later. The armature 3 is formed from a magnetic material and takes the form of a circular disc having a predetermined thickness. The circular disc-like armature 3 has a central hole 3a (FIG. 2) and three guide holes 3b (FIG. 2) arranged at equal angular intervals about the center of the central hole 3a. The guide holes 3b are aligned with the bolt-insertion holes 1b of the field 1 and loosely fitted around respective heads 7a of the attaching bolts 7. Thus the armature 3 is movable in the axial direction thereof.

As shown in FIG. 2, the field 1 further has three circular recesses 1d formed in an end face thereof which faces the armature 3. The circular recesses 1d are spaced at equal angular intervals about the axis of the field 1. The circular recesses 1d, the bolt-insertion holes 1b and the spring retaining holes 1c are all arranged on the same circle. Three hemispherical elastic members 11 made, for example, of rubber are each disposed in one of the circular recesses 1d. More specifically, the hemispherical elastic members 11 are designed such that when the brake is in the actuated or engaged state shown in FIG. 4A, part of a hemispherical surface of each hemispherical elastic member 11 projects outward from the circular recess 1d and is in contact with an opposite end face of the armature 3, as better shown in FIG. 4B.

As an alternative, the circular recesses 1d may be formed in the end face of the armature 3 for receiving therein the hemispherical elastic members 11. Also in this case, the hemispherical elastic members 11 are so designed as to have a spherical surface portion which projects from the associated circular recess 1d and is in contact with an end face of the field 1 when the brake is in the engaged state.

As shown in FIG. 1, a rotating shaft, such as a motor shaft rotatably supported by bearings (not shown), extends through the central hole 1a (FIG. 2) of the field 1. The rotating shaft 12 has an externally threaded end portion 12a of a reduced diameter. The brake plate 4 is mounted on the rotating shaft 12 such that the brake plate 4 can rotate in unison with the rotating shaft 12 and also can slide in the axial direction of the rotating shaft 12. The brake plate 4 has a lining 5 attached to one end face thereof and a plurality of fins 4d formed integrally on the other end face thereof.

Figure 3:
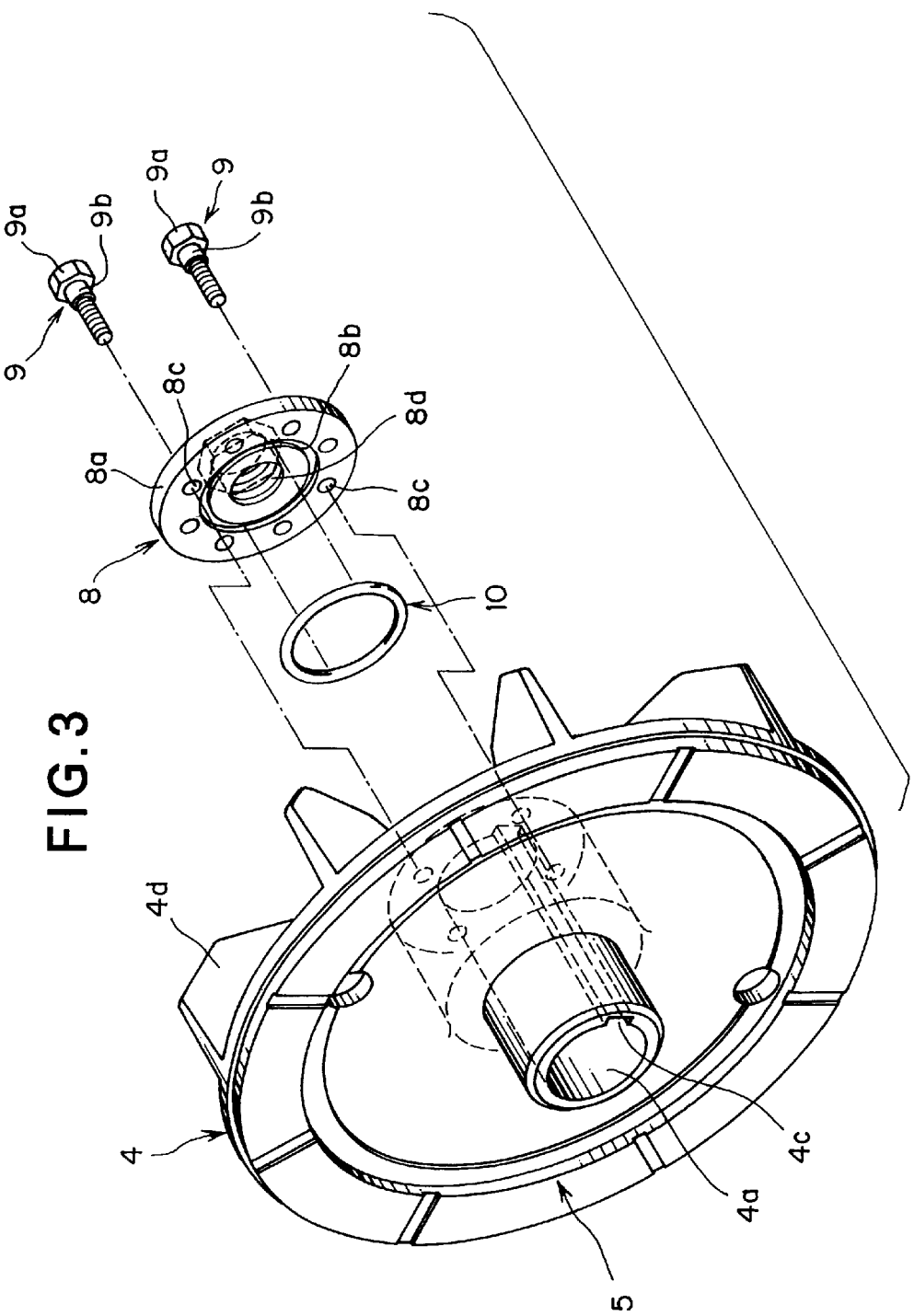
FIG. 3 is an exploded perspective view of a part of the electromagnetic brake including a brake plate, an adjustment plate and related parts thereof.

The brake plate 4 is attached to the rotating shaft 12 via an adjustment plate 8, slide-distance adjustment bolts 9 and an annular elastic member 10 (FIG. 3) such as an O-ring. As shown in FIG. 3, the adjustment plate 8 is comprised of a circular disc-like plate and has an internally threaded central hole 8d, an annular flange portion 8a, an annular groove or recess 8b formed in an inner end face of the flange portion 8a in concentric relation to the central hole 8d, and a plurality of through-holes or openings 8c extending across the thickness of the flange portion 8a. The annular elastic member (O-ring) 10 has a greater volume than the annular recess 8b and, in its free state, the annular elastic member 10 partially projects outward from the recess 8b. The slide-distance adjustment bolts 9 (two being shown) each have an enlarged head 9a at one end, a screw thread (not designated) at the other end, and a thread-free cylindrical shank 9b between the head 9a and the screw thread. The thread-free cylindrical shank 9b is larger in outside diameter than the screw thread and has a length 9t greater than the thickness 8t of the flange portion 8a by a distance s (FIGS. 1 and 4A) for a purpose described later.

When the brake plate 4 is to be mounted on the rotating shaft 12, the brake plate 4 is fitted over the rotating shaft 12 from the externally threaded end portion 12a thereof while a key seat 4c (FIG. 3) formed in the brake plate 4 is kept in alignment with a key attached to the rotating shaft 12. Then the internally threaded central hole 8d of the adjustment plate 8 is threadedly fitted over the externally threaded end portion 12a of the rotating shaft 12 until the spacing between the field 1 and the armature 3 is reduced to a predetermined gap G against the biasing force of the brake spring 6 while the inner end face of the flange portion 8a is held in abutment with end face of a boss 4b of the brake plate 4. Thereafter, the slide-distance adjustment bolts 9 are inserted into the openings 8c of the adjustment plate 8, then threaded into internally threaded holes 4e in the boss 4b of the brake plate 4 until the respective thread-free cylindrical shanks 9b abut against the end face of the boss 4b at an end adjacent to the respective screw threads of the slide-distance adjustment bolts 9. When such abutment takes place, the heads 9a of the slide-distance adjustment bolts 9 are spaced from the outer end face of the flange portion 8a of the adjustment plate 8 by a distance s. This distance s defines a maximum range of axial sliding movement of the brake plate 4 relative to the adjustment plate 8 and hence is referred to as "slide distance". In this instance, the annular elastic member (O-ring) 10 fitted in the annular recess 8b is compressed, as shown in FIG. 4.

Though not shown, the annular recess 8b formed in the adjustment plate 8 may be replaced by an annular recess formed in the end face of the boss 4b of the brake plate 4. In this case, the annular elastic member (O-ring) 10 is fitted in the non-illustrated annular recess in the boss 4b.

The slide distance s is determined by the difference between the length 9t of the cylindrical shanks 9b of the slide-distance adjustment bolts 9 and the thickness 8t of the flange portion 8a of the adjustment plate 8. This means that the slide distance s of the brake plate 4 can be adjusted by changing the difference between the length 9t of the cylindrical shanks 9b of the slide-distance adjustment bolts 9 and the thickness 8t of the flange portion 8a of the adjustment plate 8.

The spring-actuated electromagnetic brake of the foregoing construction operates as follows.

Figures 4A, 4B:
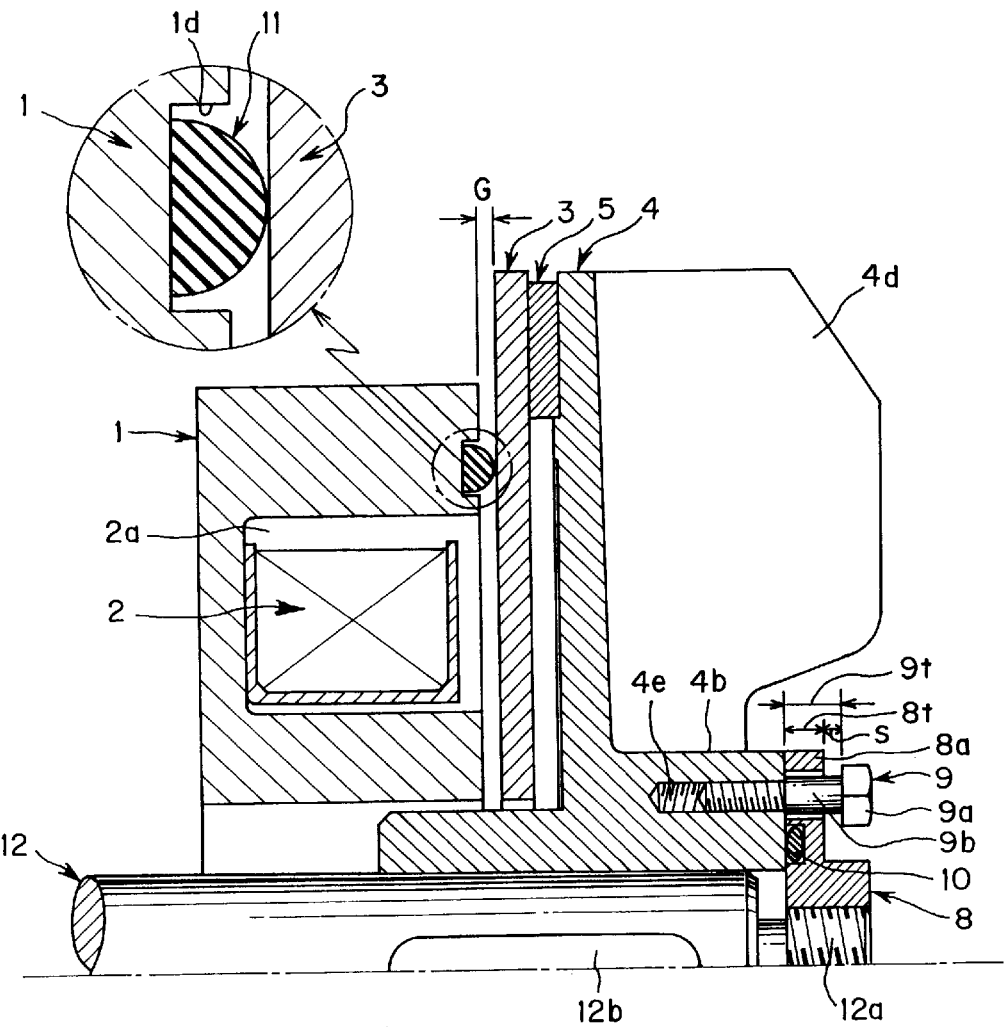
FIG. 4A is a fragmentary cross-sectional view of the electromagnetic brake as it is in the actuated or engaged state.
FIG. 4B is an enlarged view of a portion of FIG. 4A.

In the normal condition, the brake is actuated by the force of the brake springs 6, as shown in FIG. 4A. In other words, the electromagnetic coil 2 is not excited and, hence, the field 1 is not magnetized. Accordingly, by the biasing force of the brake springs 6 (FIG. 1) the armature 3 is urged against the lining 5 of the brake plate 4 and the brake plate 4 is urged rightward until the boss 4b abuts on the flange portion 8a of the adjustment plate 8. Thus, the rotating shaft 12 is brought to a full stop. The field 1 and the armature 3 are spaced from each other with the gap G defined therebetween. The hemispherical elastic members 11 disposed in the circular recesses 1d in the field 1 are in the free state in which, as shown in FIG. 4B, the elastic members 11 partially project from the recesses 1d and are in contact with the end face of the armature 3.

When the electromagnetic coil 2 is excited in order to release the brake, the field 1 is magnetized. Thus the armature 3 is attracted toward the field 1, as shown in FIG. 5A. The armature 3 is disengaged from the lining 5 of the brake plate 4, so that the braking force on the shaft 12 is released. In this instance, the hemispherical elastic members 11 are elastically deformed by the armature 3, as shown in FIG. 5B. With this elastic deformation of the hemispherical elastic members 11, a striking noise generated when the armature 11 strikes against the field 1 can be greatly suppressed. Additionally, due to its hemispherical configuration, each of the elastic members 11 can deform as a whole to become a flattened shape and does not form a local deformation. Thus, the durability of the hemispherical elastic members 11 is very high.

When the brake is released as previously described, the annular elastic member 10, due to its elasticity, is allowed to go back to its original shape 10 after being compressed within in the recess 8b of the adjustment plate 8. By an elastic recovery force produced during recovery of the original shape of the annular elastic member 10, the brake plate 4 is forced to slide toward the armature 3 until the heads 9a of the slide-distance adjustment bolts 9 abut on the outer end face of the flange portion 8a of the adjustment plate 8, as shown in FIG. 5A. Thus, the brake plate 4 is displaced toward the armature 3 by the slide distance s. Accordingly, the lining 5 approaches the armature 3 until a clearance or gap h is defined between the armature 3 and the lining 5. The gap h thus defined is smaller by slide distance s than the gap G which is provided between the field 1 and the armature 3 when the brake is in the engaged state.

From this condition, current to the electromagnetic coil 2 is removed whereupon the field 1 is demagnetized. Thus, by the biasing force of the braking springs 6 (FIG. 1), the armature 3 is urged against the lining 5 of the brake plate 4 to thereby engage the brake again, as shown in FIG. 4A. In this instance, the hemispherical elastic members 11 are allowed to go back to their original shape after being compressed in the recesses 1d. The armature 3 is, therefore, subjected to an elastic recovery force of the hemispherical elastic members 11 which acts in the same direction as the biasing force of the brake springs 6. This may add to reduction of the braking time.

Additionally, the striking distance which is represented by the travel distance achieved by the armature 3 before collision with the lining 5 is set to be equal to the gap h (FIG. 4A). Since the striking distance h is smaller than the conventional striking distance G (shown in FIG. 7A) by the slide distance s, striking noise generated when the armature 3 strikes on the lining 5 is lowered, correspondingly.

By virtue of the annular elastic member (O-ring) 10 provided behind the lining 5 as viewed from the armature 3, an impact force applied from the armature 3 onto the lining 5 is absorbed by the annular elastic member 10 as the elastic member 10 is elastically deforms gradually with movement of the brake plate 4 in a direction away from the field 1.

Obviously, various minor changes and modifications of the present invention are possible in the light of the above teaching. It is therefore to be understood that within the scope of the appended claims the present invention may be practiced otherwise than as specifically described.

What is claimed is:

1. A spring-actuated electromagnetic brake comprising:
   a stationary field having an electromagnetic coil embedded therein for magnetizing the field;
   a brake plate mounted on a rotating shaft for co-rotation with said rotating shaft;
   an armature disposed between said field and said brake plate and movable only in the axial direction of the rotating shaft;
   a brake spring urging said armature against said brake plate to normally hold said brake in the engaged state; and
   a noise-suppressing device for suppressing a striking noise emitted when said armature is attracted onto said field to release the brake when said electromagnetic coil is excited to magnetize said field, wherein said field and said armature having opposed surfaces with a plurality of finite recesses formed in one of said opposed surfaces;

said noise-suppressing device is a plurality of hemispherical elastic members disposed in said plurality of finite recesses, and said hemispherical elastic members each have a flat circular face seated in the bottom of one of said finite recesses and a hemispherical surface which, when the brake is in the engaged state, projects from said one of said recesses and is in contact with the other of said two opposed surfaces, said hemispherical surface adapted to deform as a whole to become a flattened shape.

2. A spring-actuated electromagnetic brake according to claim 1, wherein said finite recesses in said one surface are circular and are arranged concentrically with the axis of said rotating shaft and spaced in the circumferential direction at equal angular intervals.

* * * * *